Patented Mar. 24, 1953

2,632,736

UNITED STATES PATENT OFFICE 2,632,736

ANTIFOAMING COMPOSITION

Chester C. Currie, Midland, Mich., assignor to The Dow Chemical Company, Midland, Mich., a corporation of Delaware No Drawing. Application August 22, 1946, Serial No. 692,392

3 Claims. (Cl. 252—358)

This invention relates to the treatment of liquid systems which have foaming properties. It is particularly concerned with an improved antifoam composition, a small amount of which inhibits or reduces foaming when dispersed in a liquid ordinarily disposed to foam formation.

Foaming or frothing is frequently encountered at the surface of liquids, due to the entrapping of vapor, such as air, etc. Aqueous alkaline solutions, e. g. soap solutions, are particularly apt to foam and froth, especially when heated under reduced pressure, or when agitated. Examples of typical foaming problems in industry include evaporation of alkaline black liquor in the paper industry; concentration of synthetic rubber latices; steam distillation of emulsions of butadiene-styrene copolymers; use of cutting oil emulsions in the metal working industries; use of emulsion type paints, etc. Foaming is also frequently encountered in non-aqueous systems, e. g. in the manufacture of varnishes, in lubrication oil systems where oil and air are agitated together, etc.

It is known that organosiloxane polymers, e. g. dihydrocarbon siloxanes and dihydrocarbon silicates, sometimes exhibit foam-depressing properties, e. g. in lubrication oil systems. However, these materials are not always satisfactory and are of limited utility. For example, two dimethyl siloxane liquids of 900 centistokes and approximately 50,000 centistokes viscosity, respectively, were added to aqueous sodium oleate, in the ratio of 1 drop of siloxane polymer to 50 milliliters of sodium oleate, and nitrogen was bubbled through the mixtures. The time to form a predetermined volume (200 ml.) of foam was noted, and in each case was found to be only slightly (approximately 0.1 minute) greater than the time required to produce the same volume of foam with the untreated solution.

It is an object of this invention to provide an improved anti-foam composition for inhibiting the foaming and frothing of liquid systems which ordinarily tend to foam and froth. It is a further object to provide an improved foam-depressing composition which is effective in aqueous as well as non-aqueous systems.

I have found that a semi-rubbery organosiloxane polymer, particularly a semi-rubbery methyl siloxane, may be treated or modified, as by intimately admixing the same with an inorganic aerogel, to produce a highly complex material which markedly effective as an anti-foam agent.

The methyl siloxane polymer suitable for use in this invention is a highly viscous, stringy material which contains from 1.75 to 2, usually from 1.9 to 2, and preferably about 2, carbon atoms per atom of silicon. It has semi-rubbery properties, i. e. it may be stretched, and when released, has an elastic return similar to that of rubber in a rubber cement, but retains the ability to flow at room temperatures. When heated, e. g. at 200° C., it is rapidly converted into a gel, but may be kept at room temperature for much longer periods before gelation occurs.

The semi-rubbery methyl siloxane polymer may be prepared in various ways, but the lower limit to satisfactory ratios of carbon to silicon in the product varies somewhat with change in the method of making the material. For instance, the semi-rubbery methyl siloxane polymer may be made by partial oxidation of suitable liquid methyl siloxane polymers; or by the co-hydrolysis and co-condensation of hydrolyzable mono- and di-methyl silanes, such as methyl triethoxy silane, or dimethyl dihalosilanes, or mixtures of such compounds with inorganic hydrolyzable silanes; or it may be prepared by polymerization of a suitable liquid methyl siloxane in the presence of an acid or alkali as catalyst.

When the starting material is such as to produce a semi-rubbery siloxane polymer containing from 1.9 to 2 atoms of carbon per atom of silicon, the product may satisfactorily be made by any of the several methods just mentioned. The semi-rubbery methyl siloxane polymers containing from 1.9 to 2, and particularly about 2, atoms of carbon per atom of silicon are of greater stability against gelation during storage at room temperature than those wherein said ratio is lower and they are preferred. However, semi-rubbery siloxane polymers having atomic ratios of carbon to silicon as low as 1.75, but suitable for use in the anti-foaming compositions, may be prepared by heating a liquid methyl siloxane polymer containing from 1.75 to 2 atoms of carbon per atom of silicon with an aqueous mineral acid, e. g. $H_3PO_4$ or $H_2SO_4$, until the material is further polymerized to a point at which it is highly viscous and semi-rubbery.

Procedures for carrying out polymerization reactions and co-hydrolysis and co-condensation reactions such as may be applied in making the semi-rubbery methyl siloxane polymer are known to the art. The above-mentioned procedure for making such product by partial oxidation of a liquid methyl siloxane involves contacting air, or other oxygen-containing gas, with a liquid methyl siloxane, containing from 1.9 to 2.1 atoms of carbon per atom of silicon, at an elevated temperature until the viscosity has increased to a point at which the product is semi-rubbery and just about of the state of gelation.

For example, a dimethyl siloxane oil, in which the ratio of carbon to silicon is substantially two, preferably having a viscosity of 750 centistokes or higher, may be slowly oxidized by bubbling air therethrough while maintaining the mixture at an elevated temperature, e. g. 150° C. or higher. The viscosity of the liquid increases gradually until a highly viscous, stringy material is produced which has semi-rubbery properties, but retains the ability to flow at room temperature. Further heating results in a very rapid rate of increase in viscosity of the material and formation of a gel within a short time. Analysis of the above-described products for carbon and silicon shows a ratio of approximately 2.0 carbon atoms per silicon atom, indicating that very few carbon atoms are removed during the airblowing treatment at an elevated temperature. Likewise, the property of the material as a foam depressant apparently is not altered, as test portions taken intermittently during the process exhibit little variation from the starting material as an anti-foaming agent. However, if the air-blowing treatment is arrested upon formation of the stringy, semi-rubbery material previously mentioned, at which time a marked rise in the rate of change in viscosity takes place, the product is capable of combining with a finely divided inorganic aerogel, e. g. silica aerogel, to form a siloxane-aerogel complex having excellent anti-foam properties. It is important that the methyl siloxane be in the intermediate stage of oxidation just preceding gelation, to obtain satisfactory results.

The silica aerogel which is preferably employed in the anti-foam composition of this invention may be prepared by displacing water from a hydrogel in such manner as to avoid excessive shrinking or crushing of the cellular structure of the material. A method of preparing silica aerogel, which method consists essentially in displacing water from silica gel with a low boiling organic liquid such as ethyl alcohol or diethyl ether, heating the treated gel in an autoclave to approximately the critical temperature of the organic liquid, releasing vapors of the latter from the autoclave and finally evacuating the autoclave while hot and charged with the residual gel, is described by S. S. Kistler in J. Phys. Chem. 36, 52–64 (1932). Finely divided silica aerogel which is quite suitable for use in this invention is commercially available under the name "Santocel 45–F."

It is advantageous, but not essential, to employ the silica aerogel in excess over that required to modify the semi-rubbery methyl siloxane polymer. In such case the aerogel acts as a carrier for the siloxane-aerogel complex. In general from 1.5 to 7.5 parts by weight of the aerogel for each 100 parts of the partially oxidized siloxane polymer is preferred, although in some instances, as described hereinafter, greater quantities of the aerogel may be used. The mixture of finely divided silica aerogel and semi-rubbery siloxane polymer may be intimately blended by any desired means, such as by repeatedly passing the same through a paint mill. The grease-like composition which is obtained may be heated if desired, e. g. at 100° C. or thereabouts, whereby the anti-foaming property frequently is further enhanced.

When the starting materials are employed in the preferred proportions given above, the product contains considerable excess silica aerogel, which as previously stated, serves as a carrier, or adsorbent, for the active anti-foam ingredient, but which may be removed if desired, by any convenient means. For example, the grease-like anti-foam composition may be dispersed in an organic diluent, such as a liquid hydrocarbon or chlorinated hydrocarbon, and the excess solid silica aerogel be removed by filtration. The extract thus obtained possesses the foam-depressing property of the siloxane-aerogel grease.

The grease-like material of the preferred composition may be diluted with untreated liquid dimethyl siloxane polymer, if desired. It is likewise feasible to admix with each part by weight of the semi-rubbery methyl siloxane polymer up to approximately 3 parts of untreated liquid dimethyl siloxane oil prior to combining it with the silica aerogel. In the latter case, excess silica aerogel may be employed as a thickener for the diluent. However, it is generally desirable that the formulation contain silica aerogel in amount not exceeding approximately 7.5 per cent of the total composition. A highly effective antifoaming composition may be prepared by intimately admixing 30 parts by weight of a viscous rubbery methyl siloxane polymer containing an average of from 1.9 to 2.0 carbon atoms per silicon atom, approximately 63 parts of a liquid dimethyl siloxane polymer, and approximately 7.5 parts of silica aerogel. It is important to conduct the milling or mixing of the semi-rubbery methyl siloxane polymer and silica aerogel in the absence of organic solvents for the methyl siloxane, e. g. benzene, carbon tetrachloride, etc.

The grease-like composition produced by the process described above may be employed in this form, or may be dispersed in an organic liquid, e. g. benzene or toluene, prior to use as an antifoam agent. For example, a dispersion of from 0.05 to 5.0 per cent by weight of the grease-like siloxane-aerogel product in a liquid hydrocarbon is generally quite satisfactory, but more highly concentrated dispersions may be employed.

The amount of the composition required for reducing foaming varies, of course, with the nature of the foamer, and the operating conditions under which the foaming takes place, but is usually such as to contain less than 700 parts by weight of the mixture of aerogel and semi-rubbery methyl siloxane per million parts of foamer. In many instances, as little as 1 part per million may be effective, while in the case of very strong foamers, e. g. emulsions of synthetic rubbers, as much as 5,000 parts may be required. In any case, the optimum concentration for a particular application may be readily determined by preliminary tests.

The following examples describe certain ways in which the principle of the invention has been applied, but are not to be construed as limiting its scope.

*Example 1*

This example illustrates the preparation of a semi-rubbery methyl siloxane, suitable for use in the anti-foam composition of this invention, from a mixture of hydrolyzable methyl silanes.

A mixture consisting of 98.5 gram molecular equivalents of dimethyl diethoxy silane and 1.5 gram mols of methyl triethoxy silane was reacted with water containing a minor amount of sodium hydroxide. The water was added slowly to the mixed silanes with stirring, until there had been added the amount theoretically required to remove all the hydrolyzable groups present in the mixture. When the reaction was complete, ethanol formed in the process was removed by distillation.

To the residual product was added an equal volume of aqueous 20 per cent hydrogen chloride solution, and the mixture heated under reflux for an hour. After cooling, the reaction mixture was diluted with several times its volume of toluene, washed repeatedly with water, and dried over calcium chloride. Residual acid was removed by bubbling ammonia gas through the solution, and subsequently removing precipitated solids by filtration.

The reaction mixture was then heated to a pot temperature of approximately 100° C. at 10 millimeters absolute pressure, to volatilize the solvent and low boiling components. A semi-rubbery material, having a viscosity of approximately 50,000 centistokes, and satisfactory for use in the anti-foam composition of this invention, was obtained.

*Example 2*

This example illustrates the preparation of a semi-rubbery methyl siloxane by oxidation of a dimethyl siloxane oil.

A liquid dimethyl siloxane polymer having a viscosity of 1490 centistokes at 25° C., an acid number of 0.009, and an ethoxyl content of 0.27 per cent was obtained by the hydrolysis and concurrent condensation of dimethyl diethoxy silane. The reaction was carried out in the presence of a small amount of mineral acid at the reflux temperature of the hydrolysis mixture, and the oily product was washed several times with water. Subsequently, the reaction product was heated to volatilize and remove low boiling components.

A portion of the dimethyl siloxane oil was heated at 190°–200° C., while bubbling air therethrough. The rate of air flow was not measured, but was manually controlled so as to produce thorough agitation of the oil. Intermittently, the process was halted, the oil allowed to cool to room temperature, and the viscosity measured before resuming the aeration at the elevated temperature. As the airblowing proceeded, an odor of formaldehyde was noticeable.

The following viscosity changes were noted:

| Hours of heating and aeration | Viscosity, centistokes |
|---|---|
| 0.0 | 1,490 |
| 5.25 | 5,164 |
| 12.25 | 5,410 |
| 19.25 | 8,800 |
| 21.25 | 55,000 |

At this point, the heating and airblowing was stopped. The product was a stringy, semi-rubbery liquid, suitable for use in the anti-foam composition of this invention. A sample of the material gelled upon standing at room temperature for several days.

In other experiments, a similar product was obtained by airblowing dimethyl siloxane oils at temperatures of approximately 175° C. and below. In general, the lower the temperature at which the airblowing is conducted, the longer is the time required to attain the stringy, semi-rubbery stage of oxidation. However, the product obtained by the slower process of oxidation has a longer life on standing at room temperature before undergoing conversion to a gel. It might be mentioned that dilution of the stringy, semi-rubbery polymer product with untreated dimethyl siloxane oil, in ratios of 1 part by weight of the former per 2 to 3 parts of the latter, apparently slows up the process of polymerization or oxidation, or both, and increases the life of the material at room temperature. Material diluted in this manner is suitable for use in the anti-foam composition.

*Example 3*

A partially oxidized dimethyl siloxane oil prepared by procedure similar to that described in Example 2, was combined with finely divided silica aerogel, in the ratio of approximately 14 parts by weight of the former to 1 part of the latter. The mixture was blended by being passed six times through a three-roll paint dispersion mill. The resultant product was then heated for an hour at 100° C. After cooling, it was passed once through the three-roll mill. The final product was a homogeneous, grease-like composition.

The foam-depressant properties were tested in accordance with the method described by Bikerman, Transactions Faraday Society, 34, 634–638, (1938). In this experiment, a measured volume (V) of inert gas, e. g. nitrogen, was forced through a porous glass disc and through a layer of aqueous sodium oleate above it, in a given time $(t)$. The volume of foam $(v)$ which formed was measured in a calibrated tube. The relationship $$\frac{vt}{V}$$

is a measure of the "foam life," or lifetime of a unit volume of the foam. The more enduring the foam, the greater is the value of $$\frac{vt}{V}$$

and vice versa.

In each of a series of experiments, to 100 milliliters of an aqueous sodium oleate solution of approximately 2 per cent concentration was added 0.5 millimeter of a 2 per cent dispersion in benzene of the siloxane-aerogel complex described above, and the foam life of the solution determined. The value of $$\frac{vt}{V}$$

was found to be 28–52 seconds. When untreated sodium oleate solution was tested, the value of $$\frac{vt}{V}$$

was greater than 500 seconds.

A portion of the benzene dispersion of the siloxane-aerogel composition was filtered to remove excess silica aerogel, and the filtrate tested for effectiveness against foaming of aqueous sodium oleate. The foam life of the solution treated with the filtrate did not differ materially from that found for sodium oleate treated with the original grease-like composition, i. e.

$$\frac{vt}{V}$$

was less than 60 seconds.

For comparison, a portion of aqueous sodium oleate was treated with the partially oxidized methyl siloxane polymer of Example 2. The foam life of the solution was greater than 300 seconds.

*Example 4*

A mixture comprising 30.4 parts by weight of a partially oxidized methyl siloxane polymer, prepared by procedure similar to that described in Example 2, 62.4 parts of unoxidized dimethyl siloxane oil, and 7.2 parts of finely divided silica aerogel, was blended and compounded to give a smooth grease-like composition. A 2 per cent by weight dispersion of the grease in benzene was prepared.

The foam life of a test portion (100 ml.) of a 2 per cent aqueous sodium oleate solution and 0.5 milliliter of the benzene dispersion of the grease, varied from 54 to 67 seconds in several experiments.

In comparison, a grease prepared by milling together dimethyl siloxane oil which had not been converted to the semi-rubbery state described in Example 2, and silica aerogel, had little effect on the foam life of an aqueous sodium oleate solution, i. e. the value of $$\frac{vt}{V}$$

was greater than 300 seconds for such treated solution.

*Example 5*

A mixture consisting of 66 parts by weight of triethanolamine and 34 parts of triethanolamine-oleate, was diluted with twice its volume of toluene. The resultant solution had a foam life of approximately 22 seconds, as determined by the procedure described in Example 3. The addition of 0.1 milliliter of the benzene dispersion of the anti-foam composition of Example 4, to 100 milliliters of the above solution resulted in a decrease in the foam life to 2.8–4.1 seconds.

Other modes of applying the principle of the invention may be employed, change being made as regards the products herein disclosed, provided the steps or compounds stated by any of the following claims or equivalents of such steps or compounds be employed.

I therefore point out and distinctly claim:

1. An anti-foam composition comprising an intimate admixture of a viscous stringy semi-rubbery, heat-treated, air-blown dimethyl siloxane polymer and silica aerogel.

2. A method of preparing an anti-foam composition which comprises intimately admixing approximately 30 parts by weight of a viscous, stringy, semi-rubbery methyl siloxane polymer, containing an average of from 1.9 to 2.0 carbon atoms per silicon atom and having a property of undergoing gelation when heated alone at 200° C., approximately 7.5 parts of silica aerogel and approximately 63 parts of a liquid dimethyl siloxane polymer, dispersing the product in benzene, and removing undissolved silica aerogel.

3. An anti-foam composition comprising an intimate admixture of silica aerogel and a viscous, stringy, semi-rubbery, heat-treated, air-blown methyl siloxane polymer containing an average of from 1.75 to 2 carbon atoms per silicon atom and having a property of undergoing gelation when heated alone at 200° C.

CHESTER C. CURRIE.

REFERENCES CITED

The following references are of record in the file of this patent:

UNITED STATES PATENTS

| Number | Name | Date |
| --- | --- | --- |
| 2,359,913 | Hill | Oct. 10, 1944 |
| 2,371,050 | Hyde | Mar. 6, 1945 |
| 2,375,007 | Larson | May 1, 1945 |
| 2,406,671 | Diamond | Aug. 27, 1946 |
| 2,428,608 | Bass | Oct. 7, 1947 |

OTHER REFERENCES

Atkins et al., "Jour. Ind. and Eng. Chem.," 39 (1947), pgs. 1395–1401.